Aug. 2, 1949.                J. A. BROWN                2,477,785
                          INTEREST CALCULATOR
Filed March 4, 1946                              2 Sheets-Sheet 1

Aug. 2, 1949.                    J. A. BROWN                    2,477,785
                              INTEREST CALCULATOR
Filed March 4, 1946                                        2 Sheets-Sheet 2

INVENTOR.
J. A. BROWN
ATTORNEYS

Patented Aug. 2, 1949

2,477,785

UNITED STATES PATENT OFFICE 2,477,785

INTEREST CALCULATOR

James A. Brown, Houston, Tex.

Application March 4, 1946, Serial No. 651,801

8 Claims. (Cl. 235—89)

This invention relates to interest calculators for facilitating computation of interest for various elapsed time periods. More particularly, this invention is directed to interest calculators adapted for use by public utility companies, such as gas companies and electric companies, which require consumer deposits of comparatively small amounts, on which interest is paid at regular intervals, as annually, where the deposits remain more than six months—no interest being paid on deposits made less than six months prior to discontinuing service.

One of the objects of this invention is the provision of an interest calculator which will quickly and accurately indicate the amount of interest due a customer who withdraws his deposit on some date other than the regular periodic interest-payment dates from a company ordinarily paying interest on such deposits only on specified dates, as, for example, on December 31st of each year.

Another object of this invention is the arrangement in juxtaposition in a calculator, of tables separately indicating the interest due on amounts usual for customer deposits for a. The number of months since the last interest payment, b. The number of days beyond complete months, and, if desired, c. The number of complete years, with a cooperating slide adjacent each table readily adjustable to various positions corresponding to different elapsed time periods for the deposits.

Other objects and advantages will be apparent from the following description taken in connection with the accompanying drawings showing by way of example preferred embodiments of this invention.

In the drawings:

Fig. 1 is a plan view of an interest calculator constructed in accordance with this invention;

Fig. 2 is a vertical cross-section taken substantially on line 2—2 of Fig. 1;

Fig. 3 is a plan view of a modified form of interest calculator; and,

Fig. 4 is a vertical cross-section taken substantially on line 4—4 of Fig. 3.

Referring now to the drawings, the numeral 10 designates a base plate provided with a plurality of laterally spaced grooves 11 and 12 and plurality of interest tables adjacent each of said grooves. In the groove 11 is arranged a slide 13 bearing on its face a plurality of indicator divisions in each of which is marked a month of the year. In Fig. 1 the slide is shown bearing 18 months, each in its separate division space, and indicating each month of the present year and the last six months of last year. In the groove 12 is arranged a slide 14 bearing on its face a plurality of indicator divisions bearing consecutive numbers corresponding to the days of a month. In Fig. 1 there are 31 such indicator divisions on slide 14.

Cooperating with the slide 14 along one side thereof is an interest chart composed of a pair of duplicate tables 15a and 15b, respectively, arranged end to end. Table 15a has thirty-one indicator divisions and table 15b thirty divisions. The zero or bottom division of table 15a is designated 15c and is aligned with an index 16, herein shown as an arrow. The duplicate interest tables 15a and 15b are colored in contrasting colors, as for example, the upper table 15a being colored blue and the lower duplicate table 15b being colored red.

Cooperating with the slide 13 in close juxtaposition along the respective opposite sides thereof, in Fig. 1 is a pair of interest tables 17 and 18 respectively. Table 17 is arranged at the left of slide 13 directly above an index 19, herein shown as an arrow, and comprises 12 indicator divisions, each of which is subdivided horizontally into a pair of indicator spaces alternately colored with the same colors as in the duplicate tables 15a and 15b hereinabove described. Similarly the table 18 is composed of 12 indicator divisions, each of which is subdivided horizontally into a pair of indicator spaces alternately colored with the same contrasting colors as tables 15a and 15b. However, table 18 is arranged at the right of slide 13 and its lowest indicating division is spaced a predetermined distance above the lowest indicator division of table 17 equal to the space needed for indicating five months on table 17. In other words, the lowest indicator division on table 18 is in alignment with the sixth month indicator division on table 17.

In each of tables 17 and 18 the lower subdivision of each indicator division is colored with the color borne by the lower interest table 15b, and the upper subdivision is colored to accord with that of the upper interest table 15a. Furthermore, the indicia in the upper subdivision space in each indicator division of tables 17 and 18 is the same as the indicia in the lower subdivision space in the next higher indicator division.

There may be various numbers of columns in each interest table, and as shown in the embodiment illustrated in Figs. 1 and 2, each of the interest tables 15a, 15b, 17 and 18 are shown with only two interest indicating columns, by way of example. These columns, however, show the interest due on the most popular amounts for customer deposits in public utility companies, to-wit: $5.00 and $10.00 respectively. Beginning at the left in Fig. 1, the first column on table 17 is marked with the reference character A and shows the number of months; the next column, B, shows the interest due on a deposit of $5.00 for the various monthly time periods shown in column A, and the third column, marked with the reference character C, similarly shows the interest due on customer deposits of $10.00 for various elapsed monthly periods. Table 18, arranged at the right of slide 13 (marked at its top with the reference character D) is also composed of three columns, showing respectively the interest due for various elapsed monthly periods on customer deposits of $5.00 and $10.00 and the particular elapsed monthly periods. It will be noted, however, that these columns are reversely arranged with respect to those shown in table 17, the column E indicating interest amounts due on $10.00 customer deposits being next to the slide 13, the column F bearing interest amounts due on $5.00 customer deposits being next to the $10.00 interest column, and column G, showing the number of months, being at the extreme right of table 18.

Tables 15a and 15b are arranged with a guide column, marked with the reference character K, indicating the number of odd days on which interest is to be paid, a column J showing the interest amounts due on customer deposits of $5.00 for various elapsed period of days up to one month, and a column I, bearing the interest amounts due on customer deposits of $10.00 for various numbers of days up to one month.

The embodiment illustrated in Figs. 1 and 2 is particularly designed for use by a company making a practice of paying interest on customer deposits on December 31st of each year, where the amount deposited has been left with them for more than six months. If the deposit is made in any year prior to July 1st, interest payment is made on December 31st of that year. However, if the deposit is made in any year after June 30th, then interest payment is not paid until December 31st in the following year. It must be kept in mind that no interest is paid on any deposit made less than six months before discontinuing service and withdrawing the deposit.

In operation this interest calculator is adapted for use by a company whose policy is to pay interest on December 31st of each year on all accounts which are six months old or older on that date. If, when an account is closed, no such payment has fallen due on the account, then in calculating the interest to be paid for the complete or even months the reading will always be taken from table 18. On the other hand if such December 31st interest payments have previously fallen due on the account to be closed, then table 17 is used to figure the interest for the complete or even months.

It is believed that the operation of my improved interest calculator can best be illustrated by delineating its use, to-wit:

Case A.—Where the customer has already received at least one December 31st interest payment, prior to closing the account.

Case B.—Where the customer has not received any December 31st interest payment prior to closing the account.

Examples of the operation of my improved calculator for each of these cases will now be given.

Case A.—Customer opened his account with a $10.00 deposit on August 20, 1940, and closed his account September 18, 1945. It will be remembered that interest from August 20, 1940 to December 31, 1940 was paid on December 31, 1941, along with the 1941 interest payment. In addition, the last interest payment, made on December 31, 1944, paid the interest up until that date. Interest due then is only for the eight months and 18 days of the year 1945.

To calculate the amount of this interest slide 14 is moved until the index arrow 16 points to the numeral "18". Slide 14 will remain in this position for any other calculations made on this day for other customers, and may be set in the morning of each day to be ready for computations of interest of all customers withdrawing deposits that day. As the interest payment is from December 31, 1944, a reading on the scale opposite 31 will be made in column I. The value .03 is there shown, and this represents $0.03. Next the slide 13 is set so that the index arrow 19 points to September. The reading on column C of chart 17 is taken opposite the month from which the interest is to be calculated, to-wit: December of last year. In this column C, the division in alignment with December of last year, bears two subdivisions contrastingly colored. The figure is read which corresponds in color to that opposite the numeral read in column I in table 15b, where the $0.03 indication was obtained. It happens in this instance that such table is colored red and accordingly the red portion of the indicator division in column C should here be used. The number there indicated is .40 which is then added to the .03 indication obtained from column I to give the total interest due of $0.43.

Case B.—For this example we will assume that the customer's account was opened April 2, 1945, with a $10.00 deposit and that customer desires to close the account on December 7, 1945. Slide 14 is moved so that the index arrow 16 points to the numeral "7." As interest is to be paid from April 2, the reading opposite "2" on slide 14 is taken. It will be seen that this reading indicates .01 in the blue colored table 15a. Slide 13 is then set so that the index arrow 19 points to December of this year. The reading for this case will be in the column marked E of chart 18 as no December 31st interest payment has been made on the account. The reading opposite April will be taken which corresponds in color to that obtained in column I, to-wit: the blue color of table 15a. This value is indicated as .40, and the two values obtained are added to give the total interest due of $.41. It will be noted that the indications in columns B and C of table 17 correspond with those in columns E and F of table 18 wherever the two tables overlap. If an operator attempts to make an interest payment on an account which is less than six months old, the reading would fall in the blank space below table 18, reminding the operator that no interest was due on such account.

Referring now to the modification shown in Figs. 3 and 4, it will be observed that the chart for indicating the number of days less than a complete month is identical with that shown in the above described embodiment and consists of the contrastingly colored tables 15a and 15b arranged respectively above and below one another with the zero indication aligned with the index arrow 16. The central chart 20 is utilized for determining the interest due on complete months less than an entire year, and the chart 21 at the left of Fig. 3 is utilized for determining the interest due on complete years of an elapsed time period. The arrangement of chart 20 differs somewhat from the arrangement illustrated in the first described embodiment in that it comprises upper and lower tables 20a and 20b respectively positioned above and below a central horizontal division line 22 toward which points the index arrow 19. The table comprises twenty-three divisions, and each division is subdivided into upper and lower contrastingly colored spaces, corresponding to the colors of the upper and lower tables 15a and 15b in the chart at the right of Fig. 3. The central division is divided by the horizontal division line 22 forming the upper and lower tables 20a and 20b. A slide 23 is arranged adjacent chart 20 in a substantially central groove 24, and this slide is divided into 12 indicator divisions labeled consecutively from the top with the months of a year.

Chart 21 also comprises upper and lower tables 21a and 21b respectively, but unlike charts 15 and 20 they are not duplicates of each other. The upper chart 21a comprises 20 indicator divisions bearing interest computations for $5.00 and $10.00 deposits in adjacent columns. The lower table 21b comprises only 19 indicator divisions marked to designate interest computations for up to 19 years for $5.00 and $10.00 deposits in adjacent columns. A horizontal division line 25 is arranged between the upper and lower tables 21a and 21b. The reason for the difference in number of indicator divisions in charts 21a and 21b will be apparent from the following examples of the use of this modification.

The modification illustrated in Figs. 3 and 4 is particularly useful for companies that do not pay interest each year, and can be used for determining interest calculations where entire years are involved. Assume that on July 17, 1941, a $10.00 deposit was made in opening an account, and the account is being closed on September 12, 1945. The slide 14 in the right hand groove is moved until the index arrow 16 points to "12" (day on which account is closed). The reading then is taken opposite the numeral "17" (indicating day on which account started) in the interest column for the $10.00 deposit. This amount is $.04 in the lower table 15b, which we will say is colored red. The slide 23 in the central groove 24 will next be moved until the index arrow 19 points to the month September (when account is being closed), and the reading will be made in the indicator division opposite the month July (when account was opened). Which contrastingly colored subdivision of such indicator division is to be used is determined from the color of the table 15a or 15b utilized in computing the interest for the days less than a complete month. In the present example the lower red table 15b was used, so here the red or lower subdivision opposite July on the slide 23 will now be employed. The reading there shows $.05, and will be added to the $.04 previously determined from the days column at the right of Fig. 3. This combined figure of $.09 represents interest from July 17 to September 12, and leaves only complete years for further interest computation. The amounts due for interest on deposits for complete years is readily found in the chart 21 at the left of Fig. 3. In the present example, slide 26 in the left groove 27 in the modification shown in Fig. 3 would be moved until the indicator division bearing the year 1945 is aligned with the indicator arrow, substantially as shown.

The reading would then be taken from table 21a in the indicator division opposite "1941" (year in which account started) in the column for $10.00 deposits. This figure is $2.40, and should be added to the $.09 previously determined as interest due for the partial period over and above complete years. The reason for using the upper table 21a in the present instance is because the indication for the months obtained from the central chart 20 was above the heavy horizontal line 22. When the interest for the months is determined from the scale above such line 22, the upper chart 21a in the left column is used, and vice versa if the reading for the months in the central column is obtained from the chart 20b below the horizontal line 22.

As previously described the upper table 21a covers a period of 20 years while the lower table 21b covers a period of only 19 years. The reason for this difference may be readily understood by considering an example involving nearly complete years. For example, if an account was opened September 11, 1941 and closed on September 11, 1945 interest for exactly four years would be computed. Should the account have been closed out on September 12, 1945, the elapsed period would be four years and one day. In such instance the upper chart 21a would be employed. On the other hand, had the account opened on September 11, 1941 and been closed out on September 10, 1945 the account would have been in existence for three years, eleven months and twenty-nine days and the lower table 21b would be employed, because it would be found that in such instance the lower chart 20b of the central table would have been utilized in computing interest for complete months.

It has been found that my improved interest calculator speeds up the computations of interest under unusual conditions such as hereinabove described to a marked degree. Unskilled operators can be taught its use within a very short time, and their computations can rapidly be checked by a supervisor.

While I have illustrated and described what I now regard as practical and efficient embodiments of my improved interest calculator, it is to be understood that the constructions shown are merely illustrative and susceptible of various changes or modifications within the spirit and scope of my invention.

Having described my invention, I claim:

1. An interest calculator to enable the rapid determination of amounts of interest by the day, for a predetermined principal at a pre-determined rate, comprising a base plate provided with a groove; an interest column having a number of divisions arranged alongside the groove, the number of divisions being grouped into two fields of thirty divisions each equal to the number of days in a commercial month; a zero division interposed between the two fields and common to both, the divisions of each field containing pre-calculated interest amounts for a pre-determined principal at a fixed rate of interest, said interest amounts being duplicated in the corresponding divisions of the respective fields; a single slide shiftable in the groove and common to each of the fields of the interest column, said slide having a series of thirty-one divisions corresponding with the number of days in the longest months; and an index marker fixed on the base plate in line with said zero division, the slide being adjustable along the groove to position one or another of its divisions in line with the index marker whereby a selected division of the slide lies opposite an appropriate one of the interest bearing divisions in one or the other of the two fields.

2. An interest calculator having a base plate provided with a groove; a pair of interest tables, each displaying interest amounts earned by a pre-determined sum at a pre-determined rate of interest for successively increasing numbers of days in a month; the interest tables being substantial duplicates of each other and located alongside one of said grooves; an index marker fixed on the base plate at a point between the two interest tables; and a single slide having a single range of numbers representing the days of a month, and shiftable in the groove to coact with one or the other of the duplicate interest tables, said slide being adjustable relatively to the fixed index marker to enable the selection of the correct amount of interest due on any number of days in a month.

3. An interest calculator having a base plate provided with a plurality of laterally-spaced grooves, an index marker, and at least one interest table beside each groove, and indicia-bearing slides movably mounted in said grooves calibrated according to selected time units and respectively cooperating with the adjacent tables, one of said interest tables comprising a duplicate pair of contrastingly colored charts, each having 30 indicator divisions, and arranged respectively above and below its index marker, the slide cooperating with said duplicate table bearing 31 indicator divisions positioned to cooperate with either or both of said charts, and another of said interest tables having each of its indicator divisions subdivided into upper and lower spaces alternately colored with the colors borne by said duplicate tables.

4. An interest calculator having a base plate provided with three laterally-spaced grooves; index markers fixed on the base plate intermediate the ends of each groove; three charts fixedly mounted on the base plate, one alongside each groove, the three charts each comprising two successive fields, both fields of one of said charts listing interest amounts due upon a predetermined sum at a predetermined rate for any number of days up to a month, the lists on the respective fields being identical; both fields of another of said charts listing interest amounts due upon the same predetermined sum at the same rate, for complete months, said interest amounts arranged by half months, the interest amounts for the last halves of the preceding months being identical with the interest amounts for the first halves of the succeeding months; both fields of the third of said charts listing interest amounts due upon the same predetermined sum at the same rate for complete years; a slide bearing a single row of numerals representing 31 days and slidable in said groove adjacent to, and cooperating with individual listed interest amounts in both fields of the days interest chart; a second slide bearing a single row of month designations and slidable in the groove adjacent the months interest chart, said month designations cooperating with two successive semi-monthly interest amounts at a time; and a third slide bearing two successive lists of identical consecutive year designations and slidable in the groove adjacent the two field chart of years interest amounts, each consecutive year designation list on the slide cooperating with its respective field of years interest amounts, the indications of days, months and years interest amounts by the indicia on the respective slides being jointly determined by the adjustment of said slides relatively to their respective index markers, and by the location of said indication in the upper or lower field of the days interest amount chart, or in the upper or lower position of the selected semi-monthly interest amounts.

5. An interest calculator having a base plate provided with a plurality of laterally spaced grooves; interest charts, one arranged alongside each groove, in fixed relation thereto, each chart comprising two successively arranged fields, each field bearing a pre-calculated list of interest amounts based on predetermined sums at predetermined rates for days and months; an index marker for each chart, each of which markers occupies a fixed relation to its appropriate chart and to the groove with which its chart is associated; a slide bearing the 31 numerals representing days of a month, shiftable in the groove alongside the chart bearing the interest amounts for days of a month, said interest amounts running progressively in the same direction, and being substantially duplicated, on both fields of the said chart, single interest sums being indicated by the single numerals on the slide; and a slide bearing spaced month designations, shiftable in the groove alongside the chart bearing the interest amounts for complete months, said last-named interest amounts being computed for half months, and the monthly designations on the slide being of such area as to indicate two semi-monthly sums, the selection of the proper sum being determined by the location of the indicated days interest amount in the upper or lower field of the days interest chart.

6. An interest calculator comprising a days interest chart, and a months interest chart, the days interest chart including two successive fields, each of which displays a progressive series of pre-calculated interest amounts based on a predetermined sum at a predetermined rate for successive days of a month, the series of interest amounts on the respective fields being duplicated and progressing in the same direction; an index marker fixedly related to the days interest chart; a single slide bearing a list of numerals from "1" to "31" representing the days of the month, the slide being shiftable relatively to the days interest chart and to the index marker to indicate interest amounts in either field of the days interest chart; the months interest chart including a list of progressively increasing interest amounts calculated semi-monthly and based on the same predetermined sum and rate; an index marker fixedly related to the months interest chart; a slide bearing a list of month designations and being shiftable relatively to the months interest amount chart, and to its index marker, to indicate both the higher and lower semi-monthly interest amounts of a selected month, the location of the indicated days interest amount in the first or second of the successive duplicate fields of the days interest amount chart determining the election of the higher or lower semi-monthly interest amount of the two indicated by the second named slide.

7. An interest calculator having a base plate provided with a plurality of laterally-spaced grooves, an index marker, at least one interest table beside each groove, and indicia-bearing slides mounted in the grooves and calibrated in different units of time, said slides respectively cooperating with adjacent interest tables, said interest tables based on predetermined sums at selected rates for time units corresponding to the calibration of their adjacent slides, said interest tables adjacent one slide being arranged in duplicate visually contrasting sections, said sections positioned respectively above and below the index marker, and said tables adjacent another slide having each of its indicator divisions subdivided into visually contrasting upper and lower spaces corresponding with said contrasting sections of said duplicate tables.

8. An interest calculator having a base plate provided with a plurality of laterally-spaced grooves, an index marker, at least one interest table beside each groove, and indicia-bearing slides movably mounted in the grooves and calibrated in different units of time, said slides respectively cooperating with adjacent interest tables, said interest tables based on predetermined sums at selected rates for time units corresponding to the calibration of their adjacent slides, said interest table adjacent one slide being arranged in duplicate sections contrastingly colored and positioned respectively above and below the index marker, and said table adjacent another slide having each of its indicator divisions sub-divided into upper and lower spaces, respectively colored to correspond with contrasting colors of said duplicate tables.

JAMES A. BROWN.

REFERENCES CITED

The following references are of record in the file of this patent:

UNITED STATES PATENTS

| Number | Name | Date |
| --- | --- | --- |
| 733,054 | Landing | July 7, 1903 |
| 1,050,129 | Hamby | Jan. 14, 1913 |
| 1,201,205 | Legg | Oct. 10, 1916 |
| 1,484,176 | Haimes | Feb. 19, 1924 |
| 1,492,313 | Schilling | Apr. 29, 1924 |
| 1,547,264 | Porter | July 28, 1925 |
| 1,892,634 | Rubinsky | Dec. 27, 1932 |
| 2,277,993 | Preston | Mar. 31, 1942 |